United States Patent
Lim et al.

(10) Patent No.: US 12,508,950 B2
(45) Date of Patent: Dec. 30, 2025

(54) METHOD FOR BATTERY CONDITIONING OF VEHICLE

(71) Applicants: Kia Corporation, Seoul (KR); Hyundai Motor Company, Seoul (KR)

(72) Inventors: Jin Gyu Lim, Gumi-si (KR); Joong Woo Lee, Yongin-si (KR); Seung Myun Chung, Seoul (KR); Tae Geun Jeong, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 249 days.

(21) Appl. No.: 18/059,694

(22) Filed: Nov. 29, 2022

(65) Prior Publication Data

US 2023/0382269 A1 Nov. 30, 2023

(30) Foreign Application Priority Data

May 27, 2022 (KR) .................. 10-2022-0065063

(51) Int. Cl.
*B60L 58/24* (2019.01)
*B60L 53/66* (2019.01)
(Continued)

(52) U.S. Cl.
CPC ............. *B60L 58/24* (2019.02); *B60L 53/66* (2019.02); *B60L 58/12* (2019.02); *H01M 10/617* (2015.04); *H01M 10/625* (2015.04); *H01M 10/633* (2015.04); *H01M 10/635* (2015.04); *H01M 2220/20* (2013.01)

(58) Field of Classification Search
CPC .......... B60L 58/24; B60L 53/66; B60L 58/12; H01M 10/617; H01M 10/625; H01M 10/633; H01M 10/635; H01M 2220/20
See application file for complete search history.

(56) References Cited

U.S. PATENT DOCUMENTS 10,985,589 B2 4/2021 Zhou
2005/0131631 A1* 6/2005 Nakano ................ G08G 1/0969
701/532

(Continued)

FOREIGN PATENT DOCUMENTS

DE 102019114998 A1 12/2020
DE 112020003709 T5 4/2022

*Primary Examiner* — Anne Marie Antonucci
*Assistant Examiner* — Patrick M Brady
(74) *Attorney, Agent, or Firm* — Slater Matsil, LLP (57) ABSTRACT

In accordance with an embodiment, a method includes: receiving charging scheduling information including a scheduled vehicle departure time and a destination set by a user through an interface unit; determining whether a remaining time to the scheduled vehicle departure time from a current time has reached a set time; determining a required battery conditioning time required until a current battery temperature reaches a preset target temperature; determining a total estimated required time to arrival at the destination from the current time by reflecting real-time traffic information; and performing control of a thermal management system of the vehicle by adjusting the current battery temperature to the target temperature when the determined total estimated required time is less than the determined required battery conditioning time.

20 Claims, 4 Drawing Sheets

(51) Int. Cl.
*B60L 58/12* (2019.01)
*H01M 10/617* (2014.01)
*H01M 10/625* (2014.01)
*H01M 10/633* (2014.01)
*H01M 10/635* (2014.01)

(56) References Cited

U.S. PATENT DOCUMENTS

| | | | | |
|---|---|---|---|---|
| 2009/0192702 | A1* | 7/2009 | Bourne | G01C 21/3469 |
| | | | | 701/532 |
| 2010/0324765 | A1* | 12/2010 | Iida | B60L 15/2045 |
| | | | | 701/22 |
| 2012/0136574 | A1* | 5/2012 | Kobayashi | B60W 20/00 |
| | | | | 701/533 |
| 2020/0262307 | A1* | 8/2020 | Rosene | H04L 67/52 |
| 2021/0031643 | A1* | 2/2021 | Wang | H01M 10/6567 |
| 2021/0088992 | A1* | 3/2021 | Lee | G05B 19/042 |
| 2022/0045378 | A1 | 2/2022 | Yang | |
| 2022/0203863 | A1* | 6/2022 | Wu | G01R 31/3648 |
| 2022/0340012 | A1* | 10/2022 | Zhao | B60L 58/27 |
| 2023/0099547 | A1* | 3/2023 | Mandel-Senft | H02J 7/00032 |
| | | | | 320/109 |

* cited by examiner

METHOD FOR BATTERY CONDITIONING OF VEHICLE

CROSS-REFERENCE TO RELATED APPLICATIONS

The present application claims priority to Korean Patent Application No. 10-2022-0065063, filed May 27, 2022, the entire contents of which is incorporated herein for all purposes by this reference.

TECHNICAL FIELD

The present disclosure relates generally to a method for battery conditioning of a vehicle. More particularly, the present disclosure relates to a battery conditioning method that adjusts and manages the temperature of a battery to an optimum temperature before an electric vehicle arrives at a charging station for charging the battery, thereby maximizing the charging performance of the battery and shortening the charging time of the battery.

BACKGROUND

With the increased interest in issues such as energy efficiency, environmental pollution, and fossil fuel depletion in recent years, eco-friendly vehicles that can replace internal combustion engine vehicles have been actively developed.

Examples of the eco-friendly vehicles include a battery electric vehicle (BEV) that uses a battery as a power source, a fuel cell electric vehicle (FCEV) that uses a fuel cell as a main power source, and a hybrid electric vehicle (HEV) that uses both an engine and a motor as a driving source to drive the vehicle.

Such eco-friendly vehicles all have in common that they are motor-driven vehicles and electrified vehicles that are driven by a motor powered by electricity stored in batteries, and they all can be called electric vehicles (xEVs) in a broad sense. In an EV, a high-voltage battery for supplying electricity to a motor is mounted. The high-voltage battery supplies electricity to power electronic components in the vehicle, such as a motor, while it is repeatedly charged and discharged during driving of the vehicle.

Furthermore, the EV is equipped with a battery management system (BMS) that manages the overall condition of the battery. The BMS collects battery condition information through a sensor or the like, performs battery charging/discharging control on the basis of the collected battery condition information, or provides the collected battery condition information to another controller.

Furthermore, the BMS monitors the battery condition and notifies a high level controller of the charging/discharging current limit value according to the battery temperature, ambient temperature, state of charge (SOC), etc., so that vehicle driving and battery charging/discharging can be performed under optimal conditions.

The temperature of the battery mounted in the EV rises due to an internal chemical reaction during charging, and such a temperature rise causes a decrease in the charging capacity versus the rated capacity of the battery.

When the battery is charged at an inappropriate temperature, that is, when the battery is charged in a state where the temperature of the battery is too high or too low, the charging performance (charging speed, etc.) of the battery is significantly deteriorated.

Therefore, in order to ensure proper charging performance regardless of seasons in the EV, it is necessary to control battery conditioning to maintain and manage the temperature of the battery within a predetermined range before charging.

Recently, the use of EVs that need to be connected to an external charger to charge batteries therein, that is, battery electric vehicles (BEVs) or plug-in hybrid vehicles (PHEVs), has been increased. However, one of the biggest obstacles in operating these EVs is the problem of charging time.

As a method to improve the charging time problem, it is very important to check the condition of the battery during charging and to maintain the temperature of the battery at an optimum temperature so that the battery can be charged to the maximum capacity or to control the temperature of the battery to a temperature that enables high-power charging.

The charging of lithium-ion batteries widely used in vehicles is operated by controlling charging current according to voltage and battery temperature. However, the lithium-ion batteries have high sensitivity to temperature, so a charging map is constructed in consideration of the performance and durability of the battery for each temperature condition, and this charging map is used to control the charging current.

In order to control the temperature of the battery in the EV, it is necessary to use the energy stored in the battery to operate a battery heater or a cooling system such as a battery chiller.

Battery conditioning known in the art is divided into a parking mode and a driving mode. This is because there are different controllers that operate and control the battery heater in the vehicle while parking and driving. The operating time for increasing the battery temperature during parking is set short, which is insufficient time to raise the battery temperature.

Furthermore, a winter mode technique is known as a method of raising the temperature of the battery. However, the purpose of the winter mode is only to secure vehicle driving performance at low temperatures, not to secure battery charging performance. Therefore, in the winter mode, a battery heating function operates only at extremely low temperatures below −10 degrees Celsius.

Moreover, a known function of reservation air conditioning during parking is only to control the interior temperature of the vehicle according to the departure time of the vehicle, not to control the temperature of the battery, so it is impossible to secure the battery charging performance.

When the battery is not heated to an appropriate temperature before charging, a problem occurs in the charging performance. The charging time becomes much longer when the battery is at low temperatures state below zero compared to when the battery is at room temperature. Therefore, in winter or in areas with low temperatures, a strategy to increase the battery temperature before charging is essential.

Similar to the case where the battery is at low temperatures, such a phenomenon of charging time delay occurs even when the battery is at high temperatures. The conventional battery conditioning includes only the battery heating function, but does not include a battery cooling function.

Accordingly, there is an urgent need for a method to maximize the charging performance of the battery by optimally managing the temperature of the battery before the EV arrives at a charging station for charging the battery. In particular, there is a demand for a technology capable of performing battery conditioning through battery conditioning using charging scheduling information and integrated thermal management of battery cooling and heating.

The foregoing is intended merely to aid in the understanding of the background of the present disclosure, and is not intended to mean that the present disclosure falls within the purview of the related art that is already known to those skilled in the art.

SUMMARY

In an embodiment, a battery conditioning method adjusts and manages the temperature of a battery to an optimum temperature before an electric vehicle arrives at a charging station for charging the battery, thereby maximizing the charging performance of the battery and shortening the charging time of the battery.

Some embodiments provide a battery conditioning method that maintains and manages the temperature of the battery at an appropriate temperature before charging by using charging scheduling information, and performs integrated thermal management that enables both cooling and heating of the battery for temperature control of the battery.

According to one aspect of the present disclosure, a method for battery conditioning of a vehicle includes the steps of: receiving, by a controller, charging scheduling information including a scheduled vehicle departure time and a destination set by a user through an interface unit; determining, by the controller, whether a remaining time to the scheduled vehicle departure time from a current time has reached a set time; determining, by the controller, a required battery conditioning time required until a current battery temperature reaches a preset target temperature on the basis of the current battery temperature and a current ambient temperature that are detected by a sensor when the remaining time to the scheduled vehicle departure time from the current time has reached the set time; determining, by the controller, a total estimated required time to arrival at the destination from the current time by reflecting real-time traffic information; and performing, by the controller, control of a thermal management system of the vehicle for adjusting the current battery temperature to the target temperature when the determined total estimated required time is less than the determined required battery conditioning time.

Various embodiment methods advantageously maintain and manage the temperature of the battery at an appropriate temperature before charging by using charging scheduling information, and to perform integrated thermal management that enables both cooling and heating of the battery for temperature control of the battery.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF ILLUSTRATIVE EMBODIMENTS

Specific structural and functional descriptions of embodiments of the present disclosure disclosed herein are only for illustrative purposes of the embodiments of the present disclosure. The present disclosure may, however, be embodied in many different forms and should not be construed as being limited to only the embodiments set forth herein, but should be construed as covering modifications, equivalents, or alternatives falling within the spirit and scope of the present disclosure.

Although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to", should be construed in the same way.

Throughout the drawings, the same reference numerals will refer to the same or like parts. The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprise" and/or "comprising" when used in this specification, specify the presence of stated elements, steps, operations, and/or devices, but do not preclude the presence or addition of one or more other elements, steps, operations, and/or devices.

Hereinafter, an exemplary embodiment of the present disclosure will be described in detail with reference to the accompanying drawings.

The present disclosure relates to a battery conditioning method that adjusts and manages the temperature of a battery to an optimum temperature before an electric vehicle arrives at a charging station for charging the battery, thereby maximizing the charging performance of the battery and shortening the charging time of the battery.

In particular, the present disclosure provides a battery conditioning method that maintains and manages the temperature of the battery at an appropriate temperature before charging by using charging scheduling information, and performs integrated thermal management that enables both cooling and heating of the battery for temperature control of the battery.

In an embodiment, a method for battery conditioning of a vehicle is capable of maintaining and managing the temperature of the battery at an appropriate temperature before charging by using charging scheduling information. The method includes and performing an integrated thermal management that enables both cooling and heating of the battery for temperature control of the battery. To this end, the method includes receiving charging scheduling information, determining whether a remaining time to the scheduled vehicle departure time from a current time has reached a set time, determining required battery conditioning time required until a current battery temperature reaches a preset target temperature, determining a total estimated required time to arrival at the destination from the current time by reflecting real-time traffic information, and performing control of a thermal management system of the vehicle for adjusting the current battery temperature to the target temperature.

When a user (driver) of the electric vehicle has access to information on when and where to charge batteries, and particularly when a controller in a vehicle can automatically perform integrated thermal management of battery cooling and heating by using this information to control and manage the temperature of the battery, it is possible to achieve the above objective of maximizing the battery charging performance and shortening the battery charging time.

In the case of conventional battery conditioning, only a battery heating function is implemented, but a battery cooling function is not implemented. Furthermore, the battery conditioning is divided into a parking mode and a driving mode.

However, when the user sets a charging schedule for when and where to go, the controller in the vehicle, which performs battery cooling and heating control using input charging scheduling information, can perform battery conditioning by adjusting the temperature of the battery to the optimum temperature before arriving at the charging station by using both the battery cooling and heating functions without distinguishing between the driving mode and the parking mode.

The term "battery" in the sense of the present disclosure refers to a high-voltage electric vehicle battery that can be charged by connecting to a charger outside the vehicle. Such a high-voltage electric vehicle battery is connected to a motor for driving the vehicle through an inverter so as to be chargeable and dischargeable to supply electricity to the motor and be charged (energy recovery) by the motor. Furthermore, the term "battery" may refer to a battery that can be rapidly charged by connecting to a rapid charger.

Figure 1:
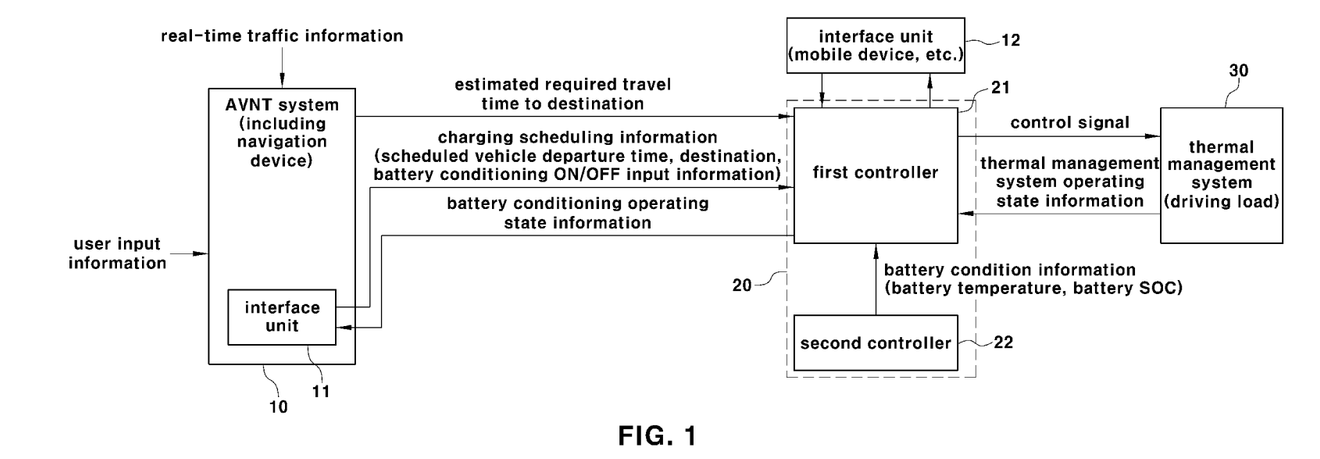
FIG. 1 is a block diagram illustrating the configuration of a system for performing a battery conditioning process according to the present disclosure.

Hereinafter, an example of a system for performing a battery conditioning process according to the present disclosure will be described. FIG. 1 is a block diagram illustrating the configuration of the system for performing the battery conditioning process according to the present disclosure.

As illustrated, the system for performing the battery conditioning process according to the present disclosure may include an audio video navigation telematics (AVNT) system 10, interface units 11 and 12, a first controller 21, a second controller 22, and a thermal management system 30.

In the present disclosure, the interface units 11 and 12 are used by the user (driver) of the electric vehicle to input one of "ON" and "OFF" of a battery conditioning mode. In other words, the user may turn on the battery conditioning mode through the interface units 11 and 12 so that a battery conditioning function is performed, and when no battery conditioning function is needed, may turn off the battery conditioning mode through the interface units 11 and 12.

The interface units 11 and 12 are connected to a first controller 21 serving as a main controller, and the operation of these interface units 11 and 12 is controlled by the first controller 21. Furthermore, when there is a user's ON or OFF operation through the interface units 11 and 12, an ON signal or an OFF signal is input to the first controller 21 from the interface units 11 and 12. Therefore, the first controller 21 recognizes an ON or OFF state of the battery conditioning mode by the user.

When the user selects and inputs "ON" through the interface units 11 and 12, the first controller 21 recognizing this enters the battery conditioning mode to perform control for the battery conditioning function. Furthermore, when the user selects and inputs "OFF" through the interface units 11 and 12, the first controller 21 recognizing this releases the battery conditioning mode and ends the control for the battery conditioning function.

As the interface units 11 and 12, any means through which the user (driver) can select and input "ON" and "OFF" of the battery conditioning mode in the vehicle can be used without any particular limitation. Furthermore, each of the interface units 11 and 12 may be an in-vehicle device including an input device and an output device installed in the vehicle. Here, the output device may be a display device that visually outputs information.

As an example, the interface units 11 and 12 may include an input device by which the user performs the ON and OFF operations, such as a button or switch provided in the vehicle, and a display device that visually outputs and displays various information such as a user input state and an operating state.

As a more specific example, the interface unit 11 may be an input/output device or a touch screen of the AVNT system 10. Alternatively, the interface unit 12 may be an input/output device or a touch screen of a cluster, or may be other input/output devices installed in the vehicle. In the case of the display device, a display device of the AVNT system 10 and a display device of the cluster may be used, and in addition to these, a headup display (HUD) may be used.

Furthermore, the interface unit 12 may be a user's mobile device. In other words, each of the interface units 11 and 12 may be one or both of the in-vehicle device and the mobile device.

When each of the above-described interface units 11 and 12 is the in-vehicle device installed in the vehicle, the user (driver) of the electric vehicle may perform the ON and OFF operations of the battery conditioning mode through his or her mobile device instead of the in-vehicle device.

The mobile device may be communicatively connectable to the in-vehicle device, for example, the first controller 21. For this purpose, an input/output communication interface (not illustrated) for communication connection between the mobile device and the first controller 21 is used.

The mobile device may be a smart device that can be communicatively connected to the first controller 21 of the vehicle, such as a smartphone or a tablet PC, and in addition to the smart phone or the tablet PC, may be a wearable smart device that can be communicatively connected directly to the first controller 21 of the vehicle or indirectly through another device (for example, the AVNT system).

An application is installed in the mobile device to perform input and output functions related to battery conditioning according to the present disclosure. Through this application, the user uses the mobile device as an interface for connection with the input/output device related to the performance of battery conditioning and the first controller 21.

In the present disclosure, the user uses the interface units 11 and 12, that is, the input device and the output device (which may be the display device) installed in the vehicle, or the mobile device so as to input charging scheduling information, such as a scheduled vehicle departure time and a destination, separately from inputting and operating "ON" or "OFF" of the battery conditioning mode.

Here, the destination is a charging place where the battery can be charged. Specifically, the destination may be a charging station where a charger is located, and more specifically, the destination may be a rapid charging station where a rapid charger is installed.

Furthermore, the interface units 11 and 12 display information provided for the user in order to perform the battery conditioning function in the battery conditioning mode through control of the first controller 21 or cooperative control with the first controller 21, and may display, for example, information indicating an operating state through a pop-up message or an icon during the operation of the battery conditioning function.

Furthermore, predetermined information to be provided for the driver in relation to battery conditioning according to the present disclosure may be displayed through the display device of each of the interface units 11 and 12. As a separate output device in addition to the input device and the display device (output device), each of the interface units 11 and 12 may further include a sound output device that outputs and provides predetermined information as sound.

Meanwhile, the information input through the interface units 11 and 12 as described above is transmitted to the first controller 21. For example, the charging scheduling information such as the scheduled vehicle departure time and the destination may be transmitted to the first controller 21 through the interface unit 11 in the AVNT system 10.

Then, a navigation device of the AVNT system 10 determines an estimated required travel time to the destination by reflecting the scheduled vehicle departure time and the destination input through the interface unit 11 and a real-time traffic situation, and transmits the determination result to the first controller 21.

Here, the estimated required travel time to the destination is determined by reflecting real-time traffic information, and may be defined as an estimated time required for the vehicle to depart from a current location to the destination in a current traffic situation.

The first controller 21 or a part of the first controller 21 (for example, a thermal management controller) wakes up when a remaining time to the scheduled vehicle departure time from a current time reaches a set time (for example, one hour before the scheduled vehicle departure time). Of course, when the vehicle is in a key-ON state, the first controller 21 is already in a wake-up state.

The first controller 21 is a main controller that performs control for battery conditioning, and may be a controller that controls the operation of the thermal management system 30 in the electric vehicle, that is, a thermal management controller.

Alternatively, the first controller 21 may include a plurality of controllers, for example, a vehicle control unit (VCU) and a hybrid control unit (HCU), which are high level controllers of the electric vehicle, and the thermal management controller. Alternatively, the first controller 21 may further include a controller (a controller or a head unit of the navigation device) (not illustrated) of the AVNT system 10.

In FIG. 1, the AVNT system 10 is illustrated as a separate device separated from a controller 20 and the first controller 21. The embodiment of FIG. 1 may be an embodiment in which the AVNT system 10 has its own controller (not illustrated) and the controller (not illustrated) of the AVNT system 10 is provided separately from the controller 20 and the first controller 21. Here, the controller of the AVNT system may be the controller or the head unit of the navigation device.

In this case, as illustrated in FIG. 1, the estimated required travel time calculated using the real-time traffic information by the controller (the controller or the head unit of the navigation device) of the AVNT system 10 is transmitted to the first controller 21 in the controller 20.

Of course, the term "controller" in the sense of the present disclosure may refer to a controller including the controller of the AVNT system 10. In this case, the controller may be collectively referred to as at least the thermal management controller and the controller of the AVNT system.

Furthermore, the first controller 21 receives battery condition information from the second controller 22. The second controller 22 provides real-time information such as a battery's state of charge (hereinafter, referred to as a "battery SOC") and a battery temperature for the first controller 21. The second controller 22 may be a battery management system (BMS) that manages the overall condition of the battery.

In the following description, control subjects that perform control for battery conditioning according to the present disclosure will be separately described as the first controller 21 and the second controller 22. However, a control process for battery conditioning according to the present disclosure may be performed by one integrated control element instead of a plurality of controllers.

The plurality of controllers or one integrated control element may be collectively referred to as a controller, and it may be understood that the control process for battery conditioning according to the present disclosure described hereinbelow is performed by the controller. In the following description, the controller 20 collectively refers to the first controller 21 and the second controller 22 unless other controllers are separately referred to.

The first controller 21 determines a time required for the battery temperature to reach a target temperature from a current temperature (a required battery conditioning time which will be described later) on the basis of information such as the battery condition information input from the second controller 22 and an ambient temperature acquired through an ambient temperature sensor 13.

Furthermore, the first controller 21 receives the estimated required travel time to the destination from the navigation device of the AVNT system 10, and determines time information for performing and controlling battery conditioning on the basis of the time required to reach the target temperature.

In this process, the first controller 21 may determine whether to perform battery conditioning only during driving, or whether to perform battery conditioning both during parking and driving, and may determine a start time of battery conditioning.

Furthermore, because the operation of the battery conditioning function may reduce the battery SOC, the first controller 21 continuously determines whether a condition for performing battery conditioning is satisfied on the basis of the battery SOC information received from the second controller 22 before and during the start of a battery conditioning operation.

When a current battery SOC does not satisfy the condition under which battery conditioning can be performed, for example, when the current battery SOC reaches a predetermined SOC lower limit, the battery conditioning operation does not start or ends even when the battery temperature does not reach the target temperature. At this time, the battery conditioning mode may be turned off.

Furthermore, the first controller 21 controls the operation of the thermal management system 30 of the electric vehicle which performs cooling and heating of the battery during the battery conditioning operation, particularly a device of the thermal management system 30 of the electric vehicle which adjusts the temperature of the battery. In other words, the first controller 21 outputs a control signal for adjusting the battery temperature to the target temperature, and controls the operation of the thermal management system 30 according to the control signal.

The device of the thermal management system 30 for adjusting the temperature of the battery may include a battery heater and a battery chiller. Here, the battery heater may be an electric heater that heats a coolant circulating through a coolant passage of the battery.

Furthermore, the battery chiller may be a heat exchanger provided so that a low-temperature and low-pressure air conditioner refrigerant expanded while passing through an expansion valve passes and heat exchange between the low-temperature and low-pressure air conditioner refrigerant and the coolant takes place. The battery chiller cools the coolant circulating through the coolant passage of the battery by using a low-temperature and low-pressure refrigerant.

Furthermore, the first controller 21 receives operating state information of the thermal management system 30 that performs heating and cooling of the battery. The operating state information of the thermal management system 30 may include real-time operating state information of a driving load.

For example, the operating state information of the thermal management system 30 may be operating state information on the driving load of the thermal management system 30, such as the battery heater and a battery chiller related device.

Here, the driving load of the thermal management system 30 may include the battery heater for heating the coolant, an electric water pump for circulating the coolant, and an electric compressor for compressing the refrigerant. Furthermore, the operating state information of the thermal management system 30 may include operating state information such as an ON/OFF state of the driving load and power consumption.

Figure 2A:
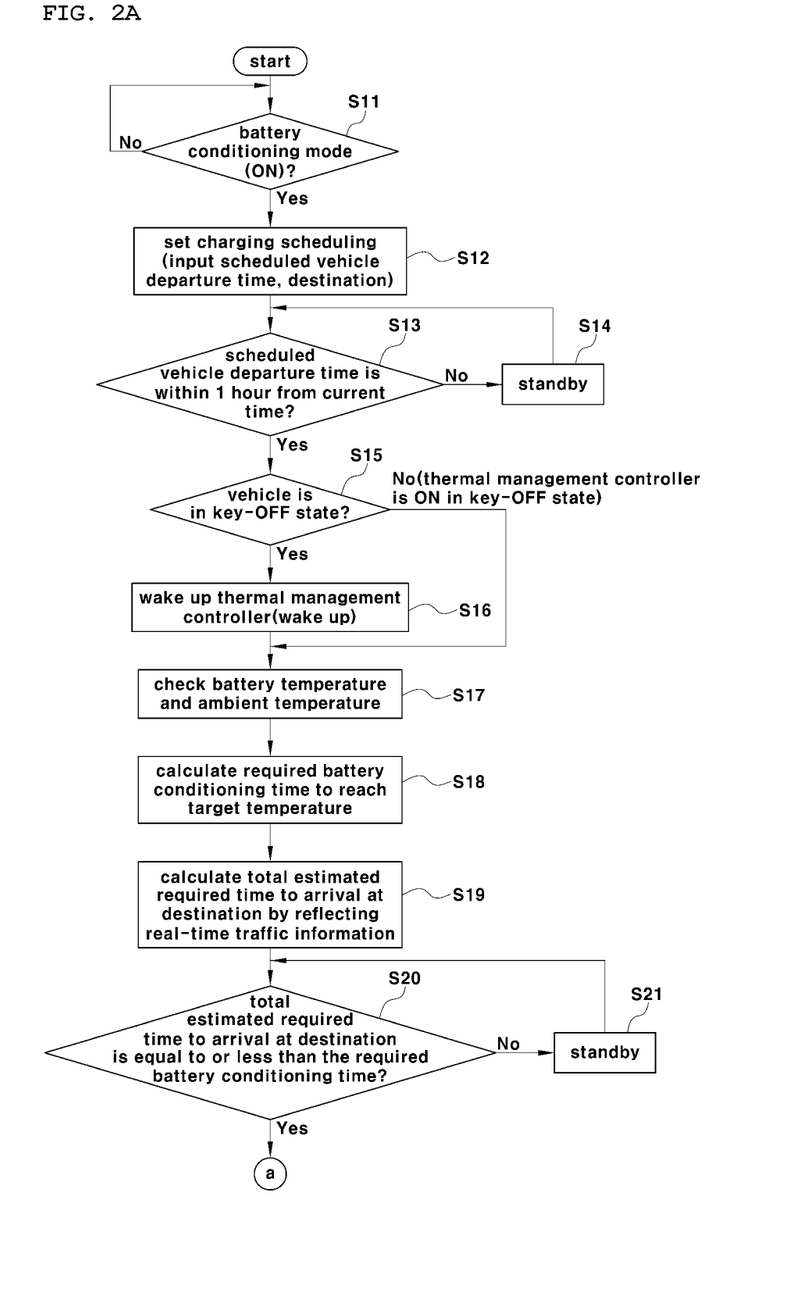
FIGS. 2A and 2B are flowcharts illustrating the battery conditioning process according to the present disclosure.
Figure 2B:
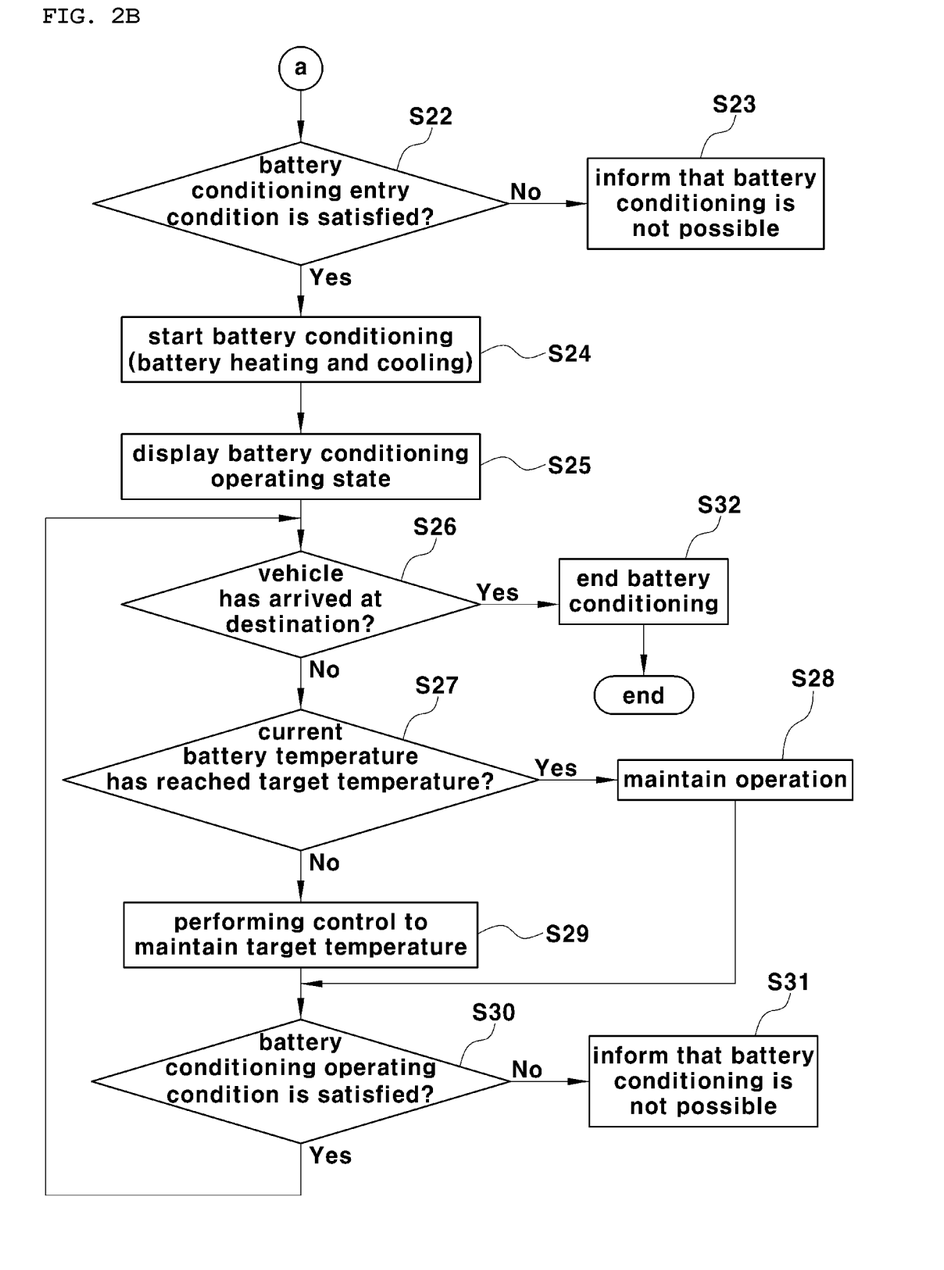
Figure 3:
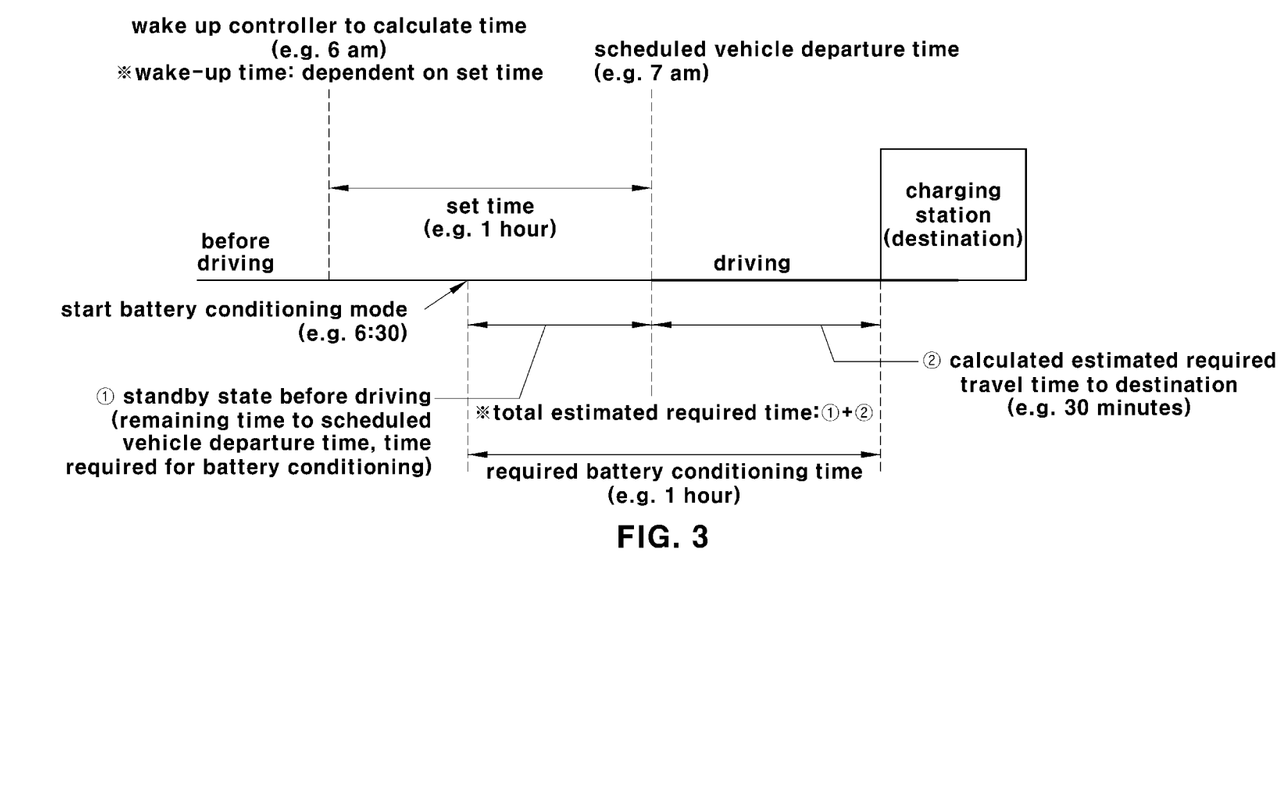
FIG. 3 is a view illustrating a scheduled vehicle departure time, a set time, and a required battery conditioning time in the present disclosure.

Next, the battery conditioning process according to the present disclosure will be described. FIGS. 2A and 2B are flowcharts illustrating the battery conditioning process according to the present disclosure. FIG. 3 is a view illustrating the scheduled vehicle departure time, the set time, and the required battery conditioning time in the present disclosure.

In the system illustrated in FIG. 1, the controller 20 (the first controller 21) recognizes the ON state and the OFF state of the battery conditioning mode through an ON operation signal or an OFF operation signal input from the interface units 11 and 12.

Furthermore, the user (driver) of the electric vehicle inputs the charging scheduling information through the interface units 11 and 12 in a state in which the battery conditioning mode is turned on (S11 and S12). At this time, the controller 20 receives the charging scheduling information from the interface units 11 and 12.

Here, the charging scheduling information input by the user through the interface units 11 and 12 may be the scheduled vehicle departure time and the destination. For example, the user may input the scheduled vehicle departure time through the interface unit (input device) ii of the AVNT system 10 installed in the vehicle, and then may input the charging station where the charger is located as the destination. Alternatively, the user may execute the application on his/her smartphone, and then select and input the scheduled vehicle departure time and the desired charging station as the destination.

In a state in which the charging scheduling information is input as described above, the controller 20 checks whether the remaining time to the scheduled vehicle departure time input by the user from the current time has reached the set time. For example, when the set time is one hour, the controller 20 checks whether the remaining time to the scheduled vehicle departure time from the current time has reached one hour.

In other words, whether the scheduled vehicle departure time is within one hour from the current time is checked (S13), and when it is not within one hour, the vehicle remains in a standby state until one hour before the scheduled vehicle departure time (S14).

However, when the scheduled vehicle departure time is within one hour of the set time from the current time (the time when the current time is one hour before the scheduled vehicle departure time), the controller 20 determines whether the vehicle is in a key-OFF state (S15).

When the vehicle is already in the key-ON state one hour before the scheduled vehicle departure time, the controller 20 (the first controller 21) is also already in an ON state, and when the vehicle is in the key-OFF state one hour before the scheduled vehicle departure time, the vehicle may be in a parked state.

Furthermore, when the first controller 21 includes the controller of the AVNT system 10 and the thermal management controller, the controller of the AVNT system 10 (or the VCU that is the high level controller) (not illustrated) may wake up the thermal management controller at the time when the remaining time to the scheduled vehicle departure time from the current time reaches the set time (for example, one hour) in the key-OFF state (S16 in FIG. 2A, see FIG. 3).

In the embodiment of the present disclosure, the set time may be a fixed value preset in the controller 20, or a variable value obtained in the controller 20 on the basis of a minimum required travel time from the current location to the destination when there is no traffic jam and the required battery conditioning time.

Then, the controller 20 checks a current ambient temperature and a current battery temperature that are detected by a sensor (S17), and calculates the required battery conditioning time to reach the target temperature on the basis of the current ambient temperature and the current battery temperature (S18). Here, the target temperature includes a target heating temperature and a target cooling temperature.

These target temperatures may be preset temperatures preset in the controller 20. For example, the target heating temperature and the target cooling temperature may be preset to 20° C. and 26° C., respectively, in the controller 20.

The ambient temperature is detected by the ambient temperature sensor 13, which is used to determine a temperature change gradient (temperature change rate) when the battery temperature changes. The controller 20 may determine the temperature change gradient from a map on the basis of the ambient temperature detected by the ambient temperature sensor 13.

Therefore, the controller 20 may calculate a time required for the current battery temperature to reach the target temperature, that is, the required battery conditioning time, according to the temperature change gradient.

For example, the temperature change gradient may be a temperature increase gradient when the battery temperature is raised. Thus, the controller 20 may calculate the required battery conditioning time (refer to FIG. 3) required to increase the current battery temperature to the target heating temperature by using the temperature increase gradient determined according to the current ambient temperature.

Furthermore, in calculating the required battery conditioning time by the controller 20, when the current battery temperature is lower than the target heating temperature, a time required to increase the battery temperature to equal to or higher than the target heating temperature is calculated as the required battery conditioning time.

Furthermore, when the current battery temperature is higher than the target cooling temperature, a time required to decrease the battery temperature to equal to or less than the target cooling temperature is calculated as the required battery conditioning time.

In the present disclosure, after waking up, until battery conditioning starts, the controller 20 (the first controller 21) may continuously calculate the required battery conditioning time by comparing a real-time battery temperature and the target temperature until the vehicle departs from the current location and arrives at the destination.

Then, the controller 20 calculates in real time the estimated required travel time to the destination from the current location of the vehicle (see FIG. 3) by reflecting the real-time traffic information received from a traffic information system outside the vehicle (S19).

When the term "controller" in the sense of the present disclosure includes the controller of the AVNT system, the controller may calculate in real time the estimated required travel time to the destination according to real-time traffic conditions.

However, in the embodiment of FIG. 1, since the controller 20 is a controller provided separately from the controller (not illustrated) of the AVNT system, the controller of the AVNT system (which may be the controller of the navigation device in the AVNT system) calculates the estimated required travel time in real time and then transmits the calculation result to the controller 20.

Then, the controller 20 calculates a total estimated required time to arrival at the destination (①+②) by adding the real-time estimated required travel time (an estimated travel time from departure to arrival at the destination) (®) to the remaining time to the scheduled vehicle departure time from the current time (②) (see FIG. 3), and compares the calculated total estimated required time to arrival at the destination with the required battery conditioning time (S20).

In the present disclosure, the total estimated required time to arrival at the destination is an estimated required time from the current time to arrival of the vehicle at the destination, and is different from the estimated required travel time calculated on the basis of the real-time traffic information.

In other words, the estimated required travel time means an estimated time from the time when the vehicle departs to the time when the vehicle arrives at the destination, and the total estimated required time to arrival at the destination means a total time from the current time to the time when the vehicle arrives at the destination (see to FIG. 3).

Therefore, the total estimated required time to arrival at the destination is the time that additionally takes into account the remaining time to the scheduled vehicle departure time from the current time (standby time until departure) in addition to the estimated required travel time to the destination, and may be calculated by adding the estimated required travel time to the destination (②) to the remaining time to the scheduled vehicle departure time (①) (see FIG. 3).

Furthermore, when before battery conditioning starts, the comparison of the total estimated required time to arrival at the destination and the required battery conditioning time may be continuously performed before the vehicle departs, that is, from when the vehicle is in the standby state before driving, until the vehicle arrives at the destination after departure.

Therefore, when the total estimated required time to arrival at the destination is compared with the required battery conditioning time, the vehicle may be in the standby state in which it is still parked or in a driving state in which it has already departed and is traveling toward the destination.

As will be described below, when the total estimated required time is equal to or less than the required battery conditioning time and a predetermined condition for entering battery conditioning is satisfied, battery conditioning may be started even when the vehicle is in the standby state before the vehicle departs.

Furthermore, when the vehicle has already departed before battery conditioning starts, the remaining time to the scheduled vehicle departure time is 0. Thus, in this case, the total estimated required time to arrival at the destination may be equal to the real-time estimated required travel time calculated by reflecting the real-time traffic information.

Then, until battery conditioning starts when the vehicle is in the parked state or the driving state, after step S19, the controller 20 compares in real time the total estimated required time to arrival at the destination with the required battery conditioning time, and continuously checks whether the total estimated required time to arrival at the destination is equal to or less than the required battery conditioning time (S20).

As described above, after the controller 20 wakes up, until battery conditioning starts, the following processes are continuously performed in real time: calculating the required battery conditioning time; calculating the estimated required travel time to the destination and the total estimated required time to arrival at the destination; and determining whether to start battery conditioning by comparing the required battery conditioning time and the total estimated required time to arrival at the destination.

Then, when the total estimated required time to arrival at the destination is not equal to or less than the required battery conditioning time in step S20 of FIG. 2A, the standby state in which battery conditioning is not started is maintained until this condition is satisfied (S21).

On the other hand, when the total estimated required time to arrival at the destination is equal to or less than the required battery conditioning time, the controller 20 checks whether a current vehicle state satisfies a preset battery conditioning entry condition (S22). Here, the battery conditioning entry condition is a condition in which the current battery SOC is equal to or greater than the predetermined SOC lower limit.

When the current battery SOC is less than the SOC lower limit as a result of comparing the current battery SOC with the SOC lower limit, the controller 20 informs the driver that battery conditioning cannot be performed through the output device of each of the interface units 11 and 12 (S23). For example, the display device of each of the interface units 11 and 12, that is, the display device of the AVNT system or the display device of the cluster, may display information, which informs the driver that battery conditioning cannot be performed.

On the other hand, when the current battery SOC is equal to or greater than the SOC lower limit, the controller 20 determines that the current vehicle state satisfies the battery conditioning entry condition and starts control for battery conditioning (S24).

The controller 20 is set to operate the driving load of the thermal management system 30 for heating the battery, for example, the battery heater and the electric water pump, when the battery temperature is lower than the target heating temperature.

Furthermore, the controller 20 is set to operate the driving load of the thermal management system 30 for cooling the battery, for example, the electric compressor and the electric water pump, which are devices related to the operation of the battery chiller, when the battery temperature is higher than the target cooling temperature.

Therefore, the controller 20 compares the current battery temperature with the preset target temperature, that is, the target heating temperature and the target cooling temperature, and when the current battery temperature is lower than the target heating temperature, starts control for operating the battery heater and the electric water pump, which are the driving loads for battery heating.

However, when the current battery temperature is higher than the target cooling temperature, the controller 20 starts control for operating the battery chiller, which is the driving load for battery cooling, and controls the operation of the electric compressor and the electric water pump to operate the battery chiller.

As a result, battery conditioning is performed under the control of the controller 20. The thermal management system 30 is operated under the control of the controller 20 so that the current battery temperature reaches the target heating temperature or the target cooling temperature.

As the operation of the thermal management system 30 is controlled by the controller 20 as described above, the battery temperature may be maintained at the target heating temperature or the target cooling temperature.

At this time, the controller 20 displays a battery conditioning operating state, that is, a current operating state of the thermal management system 30, and performs control to inform the user (S25). For example, the controller 20 may allow the operating state of the battery heater or the battery chiller to be displayed on the display device of each of the interface units 11 and 12, that is, the display device of the AVNT system 10, the display device of the cluster, or the application of the user's smartphone.

At the time when battery conditioning is performed as described above, the vehicle may be still in the parked state or may be in a state in which the vehicle has departed and is traveling toward the destination. Then, the controller 20 determines whether the vehicle has arrived at the destination (S26) and when the vehicle has arrived at the destination, ends the battery conditioning process (S32).

On the other hand, when the vehicle has not arrived at the destination, the controller 20 checks whether the current battery temperature has reached the target temperature (S27). When the target temperature has not been reached, the controller 20 maintains the operation of the battery heater or the battery chiller, which is the driving load of the thermal management system 30, until the battery temperature reaches the target temperature (S28).

On the other hand, when the current battery temperature has reached the target temperature, the controller 20 controls the operation of the thermal management system 30 (operation of the battery heater or the battery chiller) so that the battery temperature is maintained at the target temperature until the vehicle arrives at the destination (S29).

In this process, the controller 20 continuously checks whether the current vehicle state satisfies a preset battery conditioning operating condition (S30). At this time, when the current battery SOC is equal to or greater than the SOC lower limit, the controller 20 determines that the battery conditioning operating condition is satisfied, and maintains the operation of battery conditioning and the operation of the thermal management system 30 to maintain the battery temperature at the target temperature.

Then, the controller 20 maintains battery conditioning control for maintaining the battery temperature at the target temperature until the vehicle arrives at the destination, and when it is determined that the vehicle has arrived at the destination, ends the battery conditioning process.

When the current battery SOC is less than the SOC lower limit, the controller 20 informs the driver that battery conditioning cannot be performed through the output device of each of the interface units 11 and 12 (S31).

For example, the display device of each of the interface units 11 and 12, that is, the display device of the AVNT system or the display device of the cluster, may display information, which informs the driver that battery conditioning cannot be performed.

According to the battery conditioning method according to the present disclosure as described above, battery conditioning (battery heating and cooling) that adjusts and maintains the battery temperature at the optimum temperature by using the charging scheduling information is performed before the electric vehicle arrives at the charging station. This can maximize the charging performance of the battery, and shorten the battery charging time.

Furthermore, the battery temperature is adjusted and maintained at the optimum temperature before charging the battery of the electric vehicle, it is possible to efficiently charge and manage the battery, and to improve the commerciality of the vehicle.

Furthermore, as long as only charging scheduling is set, there is no need for the user to additionally operate the battery conditioning function during parking and driving, and the vehicle itself can control the charging and management of the battery.

Furthermore, the vehicle determines when to operate battery conditioning by using the current battery temperature and the current ambient temperature that are detected by the sensor, thereby enabling efficient use of the battery SOC. Also, unlike conventional battery conditioning limited only to battery heating, battery conditioning including both battery heating and cooling is performed, so it is also possible to improve the charging performance and quality of the battery in high temperature areas.

Although a preferred embodiment of the present disclosure has been described for illustrative purposes, those skilled in the art will appreciate that various modifications, additions, and substitutions are possible, without departing from the scope and spirit of the present disclosure as disclosed in the accompanying claims.

What is claimed is:

1. A method for battery conditioning of a vehicle, the method comprising the steps of:
   receiving, by a controller, charging scheduling information including a scheduled vehicle departure time set by a user to a destination set by the user through an interface unit, wherein the destination is a charging place where a battery of the vehicle can be charged;
   determining, by the controller, whether a remaining time to the scheduled vehicle departure time from a current time has reached a set time;

determining, by the controller, a required battery conditioning time required until a current battery temperature reaches a preset target temperature based on the current battery temperature and a current ambient temperature that are detected by a sensor when the remaining time to the scheduled vehicle departure time from the current time has reached the set time;

determining, by the controller, a total estimated required time to arrival at the destination from the current time by reflecting real-time traffic information; and performing, by the controller, control of a thermal management system of the vehicle by adjusting the current battery temperature to the target temperature when the determined total estimated required time is less than the determined required battery conditioning time, wherein determining the total estimated required time to arrival at the destination comprises determining an estimated required travel time to the destination from a current location of the vehicle by reflecting the real-time traffic information, and the total estimated required time to arrival at the destination is determined by adding the determined estimated required travel time to the remaining time to the scheduled vehicle departure time from the current time.

2. The method of claim 1, wherein the interface unit is one or both of an in-vehicle device including an input device and a display device installed in the vehicle, and a mobile device carried by the user.

3. The method of claim 1, wherein the controller comprises:
a controller of an audio video navigation telematics (AVNT) system configured to receive the charging scheduling information; and
a thermal management controller configured to control an operation of the thermal management system,
wherein the controller of the AVNT is set to determine whether the remaining time to the scheduled vehicle departure time from the current time has reached the set time, and wake up the thermal management controller when the remaining time to the scheduled vehicle departure time has reached the set time and the vehicle is in a key-OFF state.

4. The method of claim 1, wherein the determining of the required battery conditioning time comprises:
determining, by the controller a battery temperature gradient corresponding to the current ambient temperature; and
calculating a time required for the current battery temperature to reach the target temperature according to the battery temperature gradient to determine the calculated time as the required battery conditioning time.

5. The method of claim 1, further comprising:
checking, by the controller, whether a current vehicle state satisfies a preset battery conditioning entry condition when it is determined that the determined total estimated required time has reached the determined required battery conditioning time; and
performing, by the controller, the control of the thermal management system when the preset battery conditioning entry condition is satisfied.

6. The method of claim 5, wherein the battery conditioning entry condition is a condition in which a current battery state of charge (SOC) is equal to or greater than a predetermined SOC lower limit.

7. The method of claim 5, further comprising:
informing the user, by the controller via the interface unit that the battery conditioning by the thermal management system cannot be performed when the preset battery conditioning entry condition is not satisfied.

8. The method of claim 1, further comprising:
displaying, by the controller via the interface unit, operating state information of the thermal management system when performing the control of the thermal management system.

9. The method of claim 1, wherein the steps are performed by the controller only when the user inputs "ON" of a battery conditioning mode through the interface unit.

10. The method of claim 1, wherein:
the target temperature comprises a target heating temperature and a target cooling temperature; and
performing the control of the thermal management system by the controller comprises:
operating a driving load of the thermal management system for heating the battery when the current battery temperature is lower than the target heating temperature, and
operating the driving load of the thermal management system for cooling the battery when the current battery temperature is higher than the target cooling temperature.

11. The method of claim 1, wherein the set time is a fixed value preset in the controller, or a variable value obtained in the controller on the basis of a minimum required travel time from the current location of the vehicle to the destination when there is no traffic jam, and the required battery conditioning time.

12. A method for battery conditioning of a vehicle, the method comprising the steps of:
receiving, by a controller, charging scheduling information including a scheduled vehicle departure time set by a user to a destination set by the user through an interface unit, wherein the destination is a charging place where a battery of the vehicle can be charged;
determining, by the controller, whether a remaining time to the scheduled vehicle departure time from a current time has reached a set time;
determining, by the controller, a required battery conditioning time required until a current battery temperature reaches a preset target temperature based on the current battery temperature and a current ambient temperature that are detected by a sensor when the remaining time to the scheduled vehicle departure time from the current time has reached the set time;
determining, by the controller, a total estimated required time to arrival at the destination from the current time by reflecting real-time traffic information;
performing, by the controller, control of a thermal management system of the vehicle by adjusting the current battery temperature to the target temperature when the determined total estimated required time is less than the determined required battery conditioning time;
determining, by the controller, whether the vehicle has arrived at the destination while the control of the thermal management system is performed;
determining, by the controller, whether the current battery temperature has reached the target temperature when the vehicle has not arrived at the destination; and
performing, by the controller, the control of the thermal management system for maintaining temperature of the battery at the target temperature until the vehicle arrives at the destination when the current battery temperature has reached the target temperature, wherein determining the total estimated required time to arrival at the destination comprises determining an estimated required travel time to the destination from a current location of the vehicle by reflecting the real-time traffic information, and the total estimated required time to arrival at the destination is determined by adding the determined estimated required travel time to the remaining time to the scheduled vehicle departure time from the current time.

13. The method of claim 12, wherein performing, by the controller, the control of the thermal management system for maintaining the temperature of the battery at the target temperature comprises checking whether a current vehicle state satisfies a preset battery conditioning operating condition, and then performing the control of the thermal management system for maintaining the target temperature when the preset battery conditioning operating condition is satisfied.

14. The method of claim 13, wherein:
the battery conditioning operating condition is a condition in which a current battery state of charge (SOC) is equal to or greater than a predetermined SOC lower limit; and
the method further comprises informing the user, by the controller via the interface unit, that the battery conditioning by the thermal management system cannot be performed when the preset battery conditioning operating condition is not satisfied.

15. The method of claim 12, wherein the interface unit is one or both of an in-vehicle device including an input device and a display device installed in the vehicle, and a mobile device carried by the user.

16. A controller configured to:
receive charging scheduling information including a scheduled vehicle departure time set by a user a destination set by the user through an interface unit, wherein the destination is a charging place where a battery of the vehicle can be charged;
determine whether a remaining time to the scheduled vehicle departure time from a current time has reached a set time;
determine a required battery conditioning time required until a current battery temperature reaches a preset target temperature based on the current battery temperature and a current ambient temperature that are detected by a sensor when the remaining time to the scheduled vehicle departure time from the current time has reached the set time;
determine a total estimated required time to arrival at the destination from the current time by reflecting real-time traffic information; and
perform control of a thermal management system of the vehicle by adjusting the current battery temperature to the target temperature when the determined total estimated required time is less than the determined required battery conditioning time, wherein determining the total estimated required time to arrival at the destination comprises determining an estimated required travel time to the destination from a current location of the vehicle by reflecting the real-time traffic information, and the total estimated required time to arrival at the destination is determined by adding the determined estimated required travel time to the remaining time to the scheduled vehicle departure time from the current time.

17. The controller of claim 16, wherein the controller comprises:
a controller of an audio video navigation telematics (AVNT) system configured to receive the charging scheduling information; and
a thermal management controller configured to control an operation of the thermal management system, wherein the controller of the AVNT is configured to:
determine whether the remaining time to the scheduled vehicle departure time from the current time has reached the set time, and
wake up the thermal management controller when the remaining time to the scheduled vehicle departure time has reached the set time and the vehicle is in a key-OFF state.

18. The method of claim 1, further comprising performing, by the controller, control of the thermal management system for maintaining a temperature of the battery at the target temperature until the vehicle arrives at the destination when the current battery temperature has reached the target temperature.

19. The method of claim 18, wherein performing, by the controller, the control of the thermal management system for maintaining the temperature of the battery at the target temperature comprises checking whether a current vehicle state satisfies a preset battery conditioning operating condition, and then performing the control of the thermal management system for maintaining the target temperature when the preset battery conditioning operating condition is satisfied.

20. The method of claim 19, wherein:
the battery conditioning operating condition is a condition in which a current battery state of charge (SOC) is equal to or greater than a predetermined SOC lower limit; and
the method further comprises informing the user, by the controller via the interface unit, that the battery conditioning by the thermal management system cannot be performed when the preset battery conditioning operating condition is not satisfied.

* * * * *